United States Patent [19]

Kellar et al.

[11] Patent Number: 5,150,213
[45] Date of Patent: Sep. 22, 1992

[54] VIDEO SIGNAL PROCESSING SYSTEMS

[75] Inventors: Paul R. N. Kellar; Brian R. G. Nonweiler, both of Newbury, United Kingdom

[73] Assignee: Quantel Limited, United Kingdom

[21] Appl. No.: 725,393

[22] Filed: Jun. 28, 1991

Related U.S. Application Data

[63] Continuation of Ser. No. 580,370, Sep. 6, 1990, abandoned, which is a continuation of Ser. No. 163,184, Feb. 25, 1988, abandoned, which is a continuation-in-part of Ser. No. 713,028, Mar. 18, 1985, abandoned.

[30] Foreign Application Priority Data

Apr. 19, 1984 [GB] United Kingdom ............. 8410181

[51] Int. Cl.$^5$ ............................................. H04N 5/14
[52] U.S. Cl. ...................................... 358/160; 358/22
[58] Field of Search ............ 358/160, 22; 364/521, 364/522, 515; 340/727, 728, 729

[56] References Cited

U.S. PATENT DOCUMENTS

| | | | |
|---|---|---|---|
| 4,208,719 | 6/1980 | Lotz et al. ............. | 358/160 |
| 4,472,732 | 9/1984 | Bennett et al. ......... | 358/22 |
| 4,563,703 | 1/1986 | Taylor et al. .......... | 358/160 |
| 4,709,393 | 11/1987 | Taylor et al. .......... | 382/41 |

FOREIGN PATENT DOCUMENTS

| | | | |
|---|---|---|---|
| 2129480 | 6/1971 | Fed. Rep. of Germany . | |
| 81/02939 | 10/1981 | PCT Int'l Appl. . | |
| 2100956 | 1/1983 | United Kingdom ....... | 358/160 |
| 2119594 | 11/1983 | United Kingdom . | |

OTHER PUBLICATIONS

Leonard, Eugene "Considerations Regarding the Use of Digital Data to Generate Video Backgrounds" SMPTE Journal vol. 87 pp. 499-504 Aug. 1978.

Primary Examiner—James J. Groody
Assistant Examiner—David E. Harvey
Attorney, Agent, or Firm—Cooper & Dunham

[57] ABSTRACT

A video processing system which can produce a different shape of output picture than the input. Addresses into which incoming picture points must be written to produce the desired shape changes are stored in a shape store. These addresses can also be manipulated in real time so that the position of the shape they define is changed. For example a Mercator projection of a map can be projected onto a globe and this globe could then be tilted, rotated etc.

30 Claims, 5 Drawing Sheets

Fig. 1. (PART 2)

Fig.4. PROCESSOR 9

Fig.5. PROCESSOR 10

Fig.6.
AREA CALCULATION

Fig.7.
SPATIAL INTERPOLATION
OF VIDEO SIGNAL

VIDEO SIGNAL PROCESSING SYSTEMS

This is a continuation of application Ser. No. 580,370, filed Sep. 6, 1990, now abandoned, which in turn is a continuation of Ser. No. 163,184, filed Feb. 25, 1988 (abandoned), which in turn is a continuation of Ser. No. 713,028, filed Mar. 18, 1985 (abandoned).

BACKGROUND OF THE INVENTION

This invention relates to video signal processing systems, especially though not exclusively for producing so called production effects in television.

In our co-pending Patent Application No. 8306789 there is described a video signal processing system in which production effects are produced by writing input video signals, received in television raster format, into storage locations of a frame store so chosen that when the signals are subsequently read from the storage locations in television raster format, the signals are re-arranged in the raster to alter the image in shape, size or position, or in some other way. In order to achieve the selection of storage locations for the input signals a shape store is provided containing, at positions which correspond to respective pixel positions in the television raster, address signals identifying storage positions in the frame store at which the input video signals should be written in order to achieve the desired effect. A set of address signals describing a desired shape or other characteristic of an image is called an address map. Normally the address map is only coarsely sub-divided, comprising, say, an address for each eighth pixel, in each eighth line of a frame. Sequences of address maps are provided to produce changing effects, successive maps in a sequence describing, say every fourth field. The addresses are thus distributed on a coarse grid, and interpolating means are provided to produce addresses for the intervening pixels and also for the intervening fields. This allows addresses to be read at a rate less than 'real time', but to be used after interpolating for writing the input video signals in the frame store in real time.

The stored maps are entered in the shape store from a computer having a keyboard or other control means by which desired production effects can be entered into the computer. The computer is arranged to generate the addresses for desired maps under software control. Effects which can be produced in the image include such effects as rolling a sheet into a cylinder, turning pages of a book, or converting, say a map in Mercator projection into a representation of the map on a globe. To enable effects to be created which involve changing the image of a two dimensional object into a three dimensional object, or turning an object in space, the computer is arranged to generate addresses in three dimensions, and then convert the three dimensional addresses into two dimensional addresses by projection on the image plane, taking account of perspective.

Each storage location in the frame store in which the re-arranged video signals are written will correspond to a pixel in the output signal television raster. However, in general, the address calculated by the computer will not coincide with a storage location in the frame store but will lie within a rectangular area defined by four storage locations. Therefore on writing an input video signal (relating to a pixel in the input signal raster) in the frame store, it is usually necessary to distribute the signal among four storage locations by interpolation, (this interpolation being different from the address interpolation previously referred to). This means that up to four storage locations have to be accessed for each address obtained directly or by interpolation from the map. As a corollary, each storage location has to be accessed a plurality of times in response to different addresses. Furthermore the distribution of addresses in a map over the area of the output image may vary, so that the 'density' of addresses per unit area will differ on the image. This can lead to incorrect variations in brightness over the output image. This effect can be appreciated by considering the change of a map in Mercator projection into the image of a map on a globe, in which case all video signals representing the top of the first map would be crowded in the region of the north pole on the globe. To reduce this effect, means are provided to variably attenuate video signals, prior to writing in the frame store, in proportion to the density of addresses to produce density compensation.

The system described in the aforesaid patent application represents a powerful means of producing video effects in real time. The address maps have, however, to be produced off line, and this involves the producer in trying to determine all effects which he may desire for a particular programme or series of programmes, since he does not have the facility of creating effects during the transmission of television signals.

SUMMARY OF THE INVENTION

In accordance with the present invention there is provided a video signal processing system comprising frame store means, input means for receiving sequences of picture point signals defining successive pictures, shape store means for signals representing address maps for re-arranging input video signals received in raster format, and circuit means for manipulating address signals derived from said store so as to produce movement of the image shape defined by said address signals.

Preferably, said shape store is arranged to store three dimensional address signals and said circuit means is arranged to manipulate said signal in three dimensions and then convert them into two dimensional address signals by projection on an image plane, taking account of perspective.

The present invention is based on the realisation that greater flexibility of control can be achieved without undue hardware complexity by effecting movement of the shapes defined by the address maps using circuit means, which allow the movements to be continuously adjusted in real time by the producer, rather than by the provision of respective address maps which have to be created off line. Conveniently the circuit means is arranged to produce rotation about three axes, or displacement in three dimensions, or combinations of these. The invention reduces the number of address maps which need to be stored and although it remains necessary to store a library of individual address maps and sequences of such maps, the number of effects which can be produced is no longer limited to the number of predetermined maps. The conversion to two dimensional addresses after manipulation also adds to the flexibility of the system.

BRIEF DESCRIPTION OF THE DRAWINGS

In order that the invention may be more clearly understood and readily carried into effect, it will now be more fully described with reference to the accompanying drawings in which.

DETAILED DESCRIPTION OF THE INVENTION

Figure 1:
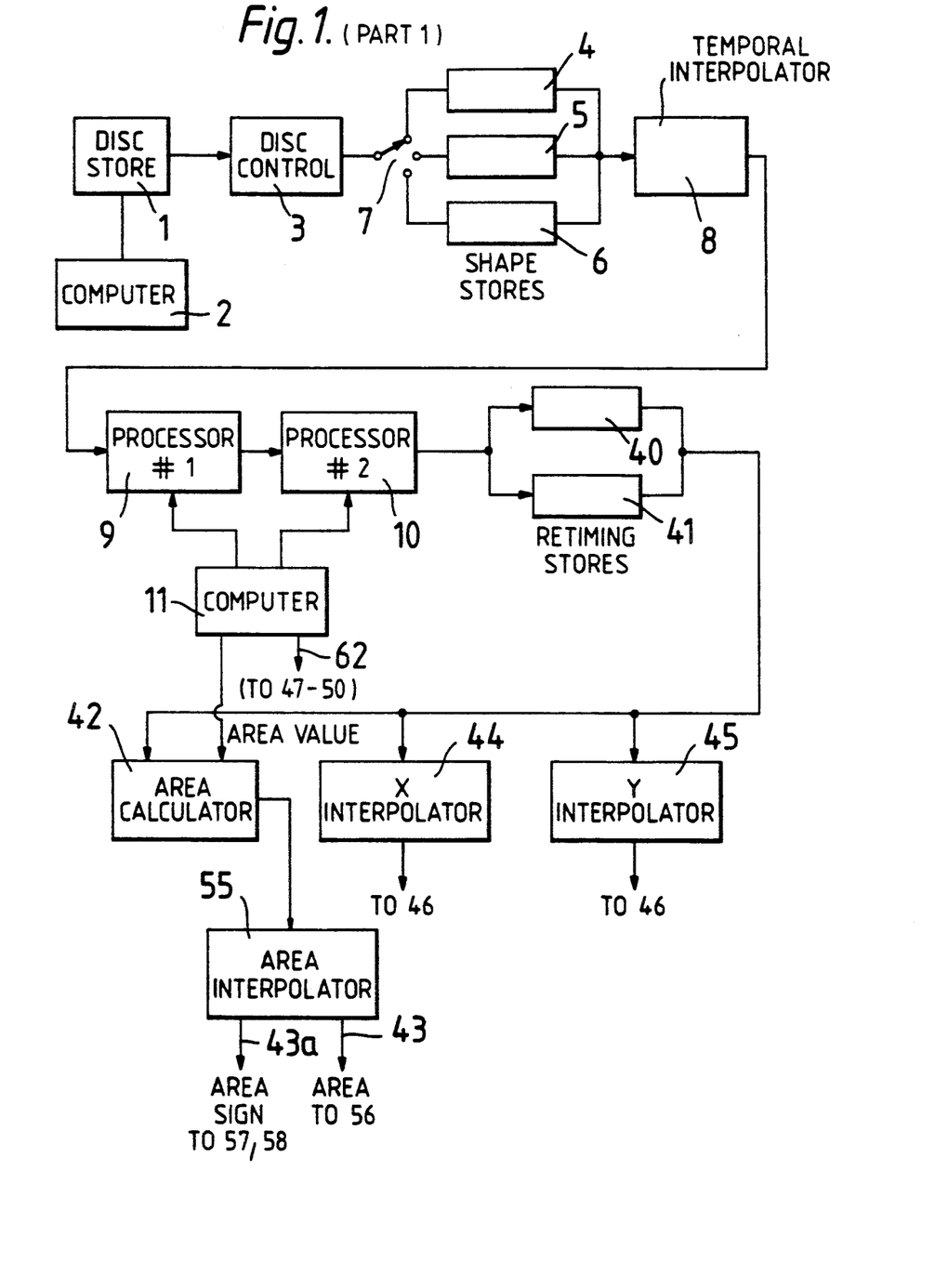
FIG. 1, parts 1 and 2, illustrate in block form on example of a video signal processing system according to the present invention. The figure is in two parts.
Figure 2:
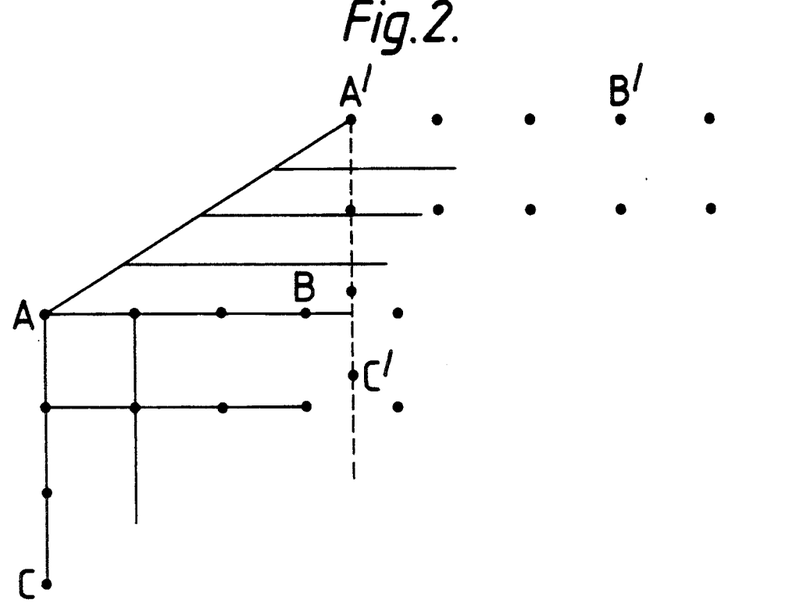
FIGS. 2 and 3 are diagrams explanatory of the operation of part of the system illustrated in FIG. 1.

Referring to the drawings, reference 1 denotes a shape library for storing predetermined groups of signals defining addresses in a television raster. The library is in the form of a magnetic disc store and it is arranged to store a three dimensional address for each pixel on the coarse grid which makes up the map of a shape, and a map is provided, say for every fourth television field in a sequence making up one continuous effect. Each dimension of an address comprises an 16 bit word, of which one bit is a flag bit the purpose of which need not be discussed in this application. In FIG. 2, the dots in the frame ABC (only partly shown) represent pixel positions in the input television raster of the system. It is to be understood that the pixels represented comprise only every eighth pixel on every eighth line, and the store 1 stores a three dimensional address for each such pixel. Assuming that the address map for the frame ABC is one of a sequence predetermined to effect transformation of the output image through a sequence of shapes, other address maps are stored for subsequent frames, such as A'B'C' which is represented as being the fourth field after ABC. Some of the pixels for which addresses are represented are also shown on this frame. Reference 2 denotes the computer used to generate the addresses in response to commands, introduced via a keyboard or other input means such as a touch tablet. The controller for the disc store 1 is indicated by the Reference 3. The disc store has, of course, the capacity to store many shape maps or reference of such maps.

Address signals read from the disc store 1 are applied via the controller 3 selectively to three 20,000 word shape buffer stores 4, 5 and 6 via switching means indicated diagrammatically at 7. The switch is phased by the sequencer for the system, so that address maps are fed in sequence to the three buffers from the store 1 in successive periods, each comprising four fields. During any one such period, therefore, address maps are available in two of the buffers, whilst a new address map is in course of being written into the third buffer. This gives adequate time for addressing the disc store despite its relatively slow rate of operation compared with the television pixel rate. During the period in question, the two buffers, say 4 and 5, already containing address maps are read in parallel into a temporal interpolator 8 which produces, by interpolation, four coarse grid address maps, one in each of the four field periods, from, say, the frame ABC to the frame A'B'C' in FIG. 2. It will be understood that the addresses in both maps ABC and A'B'C', will contribute more or less to the interpolated addresses as the frame timing advances from that of ABC to that of A'B'C', thence the description "temporal" interplation. The interpolator 8 may be of the form described in our co-pending patent application no. 8306789. The interpolated address maps are fed out, frame by frame, to a first processing circuit 9.

It will be understood that at this point the address maps are still coarse maps and that the address signals are three dimensional.

The processing circuit 9 is arranged to manipulate address signals received from the interpolator 8, so as to produce the effect of movement of the respective image shape. The manipulated signals are then passed to a second processing circuit 10, which is arranged to convert the three dimensional address signals to two dimensional address signals related to a single image plane, with perspective. Assume that a three dimensional shape, described by a particular coarse address map, is represented by 64×100 co-ordinates in each of x, y and z. To move this three dimensional shape, 4×4 matrix transforms are used, three for producing rotations about the axis and three for producing translations along the axis.

The transforms for rotations are as follows:

1. Rotation about $x$ axis $\begin{bmatrix} 1 & 0 & 0 & 0 \\ 0 & w & X & 0 \\ 0 & Y & Z & 0 \\ 0 & 0 & 0 & 1 \end{bmatrix}$ 2. Rotation about $y$ axis $\begin{bmatrix} w & 0 & -X & 0 \\ 0 & 1 & 0 & 0 \\ -Y & 0 & Z & 0 \\ 0 & 0 & 0 & 1 \end{bmatrix}$ 3. Rotation about $z$ axis $\begin{bmatrix} w & X & 0 & 0 \\ Y & Z & 0 & 0 \\ 0 & 0 & 1 & 0 \\ 0 & 0 & 0 & 1 \end{bmatrix}$ Where $w = \cos \theta$, $X = (-\sin \theta)$
$Y = \sin \theta$, $Z = \cos \theta$ The transforms for displacement are as follows:

1. $x$ translation $\begin{bmatrix} 1 & 0 & 0 & 0 \\ 0 & 1 & 0 & 0 \\ 0 & 0 & 1 & 0 \\ X & 0 & 0 & 1 \end{bmatrix}$ X = translation distance 1. $y$ translation $\begin{bmatrix} 1 & 0 & 0 & 0 \\ 0 & 1 & 0 & 0 \\ 0 & 0 & 1 & 0 \\ 0 & Y & 0 & 1 \end{bmatrix}$ X = translation distance -continued 1. z translation $\begin{bmatrix} 1 & 0 & 0 & 0 \\ 0 & 1 & 0 & 0 \\ 0 & 0 & 1 & 0 \\ 0 & 0 & Z & 1 \end{bmatrix}$ Z = translation distance Any desired move in three dimensions can be defined by multiplying a number of the above basic transforms and it is to be noted that, due to the nature of matrix multiplication, the order in which the transforms are multiplied is critical. The processing circuit 9 is arranged (as will appear) to apply the resultant movement transform to the three dimensional coarse map from the interpolator 8 as twelve co-efficients. The co-efficients themselves are evaluated in a computer 11 which is arranged to perform the matrix multiplication. The particular multiplications which are performed in the computer 11 are determined by operator control of a joystick or other means by which the producer can signal a desired movement of the image shape to the system. the manipulation of one line of the coarse map (for a particular field) can be represented as follows:

$$\begin{bmatrix} x_1 & y_1 & z_1 & 1 \\ x_2 & y_2 & z_2 & 1 \\ \vdots & & & \\ x_{100} & y_{100} & z_{100} & 1 \end{bmatrix} \begin{bmatrix} a_1 & b_1 & c_1 & d_1 \\ a_2 & b_2 & c_2 & d_2 \\ a_3 & b_3 & c_3 & d_3 \\ a_4 & b_4 & c_4 & d_4 \end{bmatrix}$$

The quantities a,b,c, etc. are the co-efficients evaluated by the matrix multiplication. The d column is not in fact used and as a general result the co-ordinates, after manipulation to effect the image movements, can be expressed as follows, for a representative address after movement) $x_i' y_i' z_i'$:

$$x_i' = a_1 x_i + a_2 y_i + a_3 z_i + a_4$$

$$y_i' = b_1 x_i + b_2 y_i + b_3 z_i + b_4$$

$$z_i' = c_1 x_i + c_2 y_i + c_3 z_i + c_4$$

Figure 3:
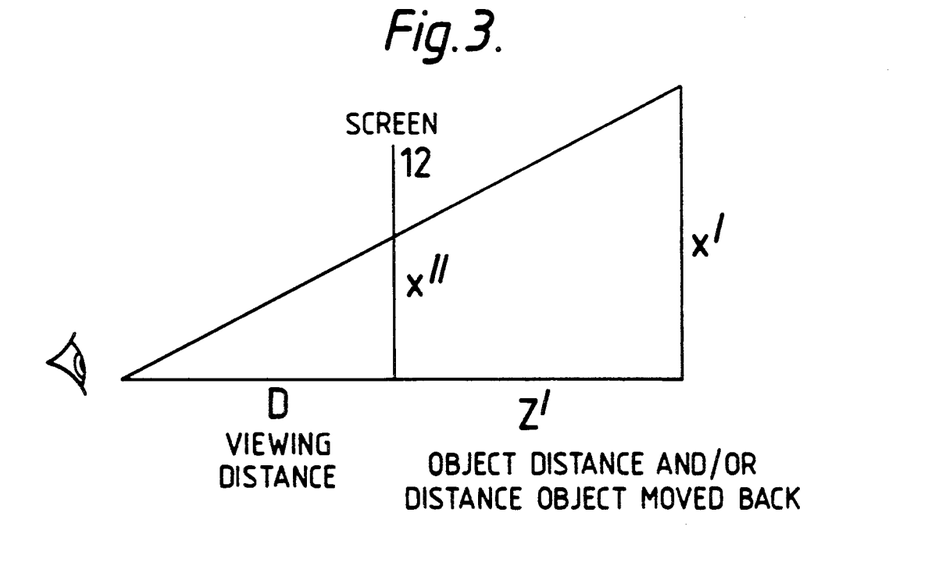

Reference will now be made to FIG. 3 to explain the operation of the second processor 10, in converting manipulated addresses produced by the processor 9 from three dimensions to two dimensions. This shows the x and z co-ordinates x' and z' respectively of an address calculated by the processor 9 (the y co-ordinate y' not being visible on the drawing). The line 12 represents the position of the image plane (the viewing screen of the television receiver) on which the image is to be projected for viewing and D represents the viewing distance. The figure illustrates that to produce the two dimensional image on the image place, with correct perspective, the co-ordinate x' has to be converted to x" and the corresponding y' co-ordinate similarly converted to y". The drawing shows that:

$$\frac{x''}{D} = \frac{x'}{z' + D}$$

$$\therefore x'' = \frac{x'D}{z' + D}$$

$$= \frac{x'}{\frac{z'}{D} + 1}$$

Similarly $$y'' = \frac{y'}{\frac{z'}{D} + 1}$$

The quotient $z'/D + 1$ is in fact produced directly in the processor 9 by pre-multiplying all the c co-efficients by $1/D$ and adding 1. Hence, referring to the equation of $z_i'$ above:

$$z'' = \frac{z_i'}{D} + 1 = \frac{c_1 x_i}{D} + \frac{c_2 y_i}{D} + \frac{c_3 z_i}{D} + \frac{c_4}{D} + 1$$

Then: $x'' = \frac{x'}{z''}$ and $y'' = \frac{y'}{z''}$ or: $x'' = \frac{x' \cdot 1}{z''}$ and $y'' = \frac{y' \cdot 1}{z''}$ In the processor 10, the quantity $1/z''$ is derived using floating point arithmetic. The mantissa may be arranged to lie in the range of 0.5–1, and it is then possible to evaluate $1/z''$ using the approximation :

$$1/z'' = 2a - z''a^2$$

Where a is approximately the value of one divided by the top eight bits of z'.

As $z' \to 0$, $z'' \to 1$, $x'' \to x'$

As $z' \to \infty$, $z'' \to \infty$, $x'' \to 0$

Figure 4:
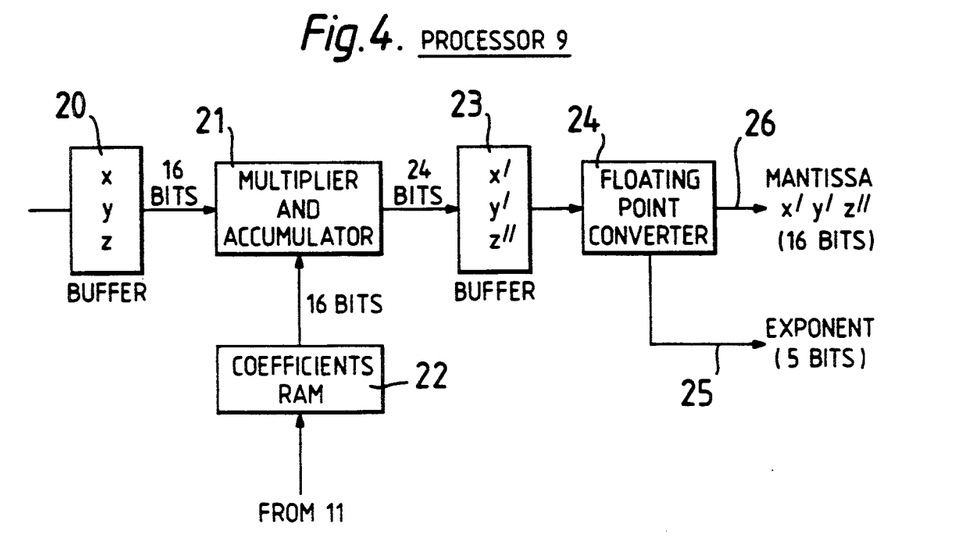
FIG. 4 illustrates details of a signal processor included in the system illustrated in FIG. 1.
Figure 5:
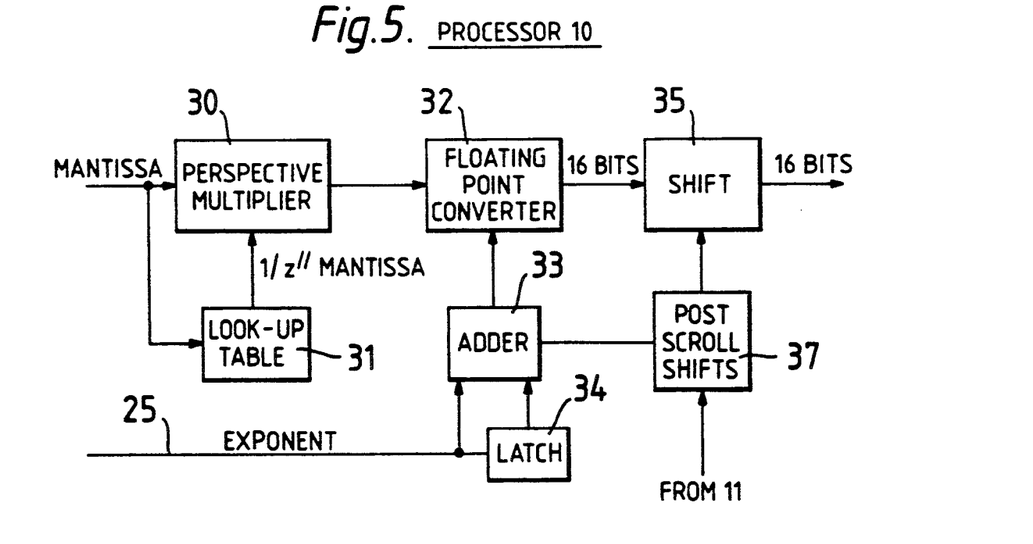
FIG. 5 illustrates details of a second signal processor of the FIG. 1 system.

The manner in which the foregoing algorithms are applied is illustrated in FIGS. 4 and 5. According to FIG. 4 which illustrates the processor 9, the x,y and z address signals in the form of 16 bit words from the temporal interpolator 8 are fed to a buffer 20 and thence are read into a multiplying and accumulating circuit 21, in which are performed the evaluations of x', y' and z" referred to above. The twelve co-efficients required for each address evaluation are derived by the matrix multiplications previously referred to, which are carried out, as stated, in the computer 11 and delivered to a co-efficients RAM 22, from which they are applied, as 16 bit words to the circuit 21. The output signals from the circuit 21, are 24 bit words comprising of the three co-ordinates x', y' and z". These signals are temporarily held in a buffer store 23 before being applied to a floating point converter 24 the output of which, for each co-ordinate of an address, comprises an exponent of five bits on the output 25 and a mantissa of 16 bit delivered on the output 26.

The second processing circuit 10, comprises, as shown in FIG. 5, a multiplier 30 and a look up table 31. The output 26 from FIG. 4, is applied in parallel to the multiplier 30 and the look up table 31. The look up table responds to the mantissa of each z co-ordinate to derive the mantissa of $1/z''$ and applies this with multiplier 30, where it is multiplied by the corresponding x' and y' mantissae. The products are fed to a floating point converter 32. The respective exponents of each product, appearing on the output 25 of the processor 10, are added to the adder 33, the earlier exponent being delayed by latch 34 as required. The sum of exponents from the second input to the converter 32 and the 16 bit x" and y" outputs of the converter, with fixed point, is applied to a shift circuit 35. This receives post scroll signals from a generator 37 which in response to commands from the computer 11, moves the original of the co-ordinates from the centre of the image plane to the origin of the raster scan.

Reverting to FIG. 1, the output of the processor 10 comprises the two dimensional addresses to which pixels on the coarse address grid in the input raster should be transferred in the output raster; these addresses depend both on the shape and the movement to be imparted to the input image. These addresses are applied alternately to further shape stores 40 and 41, during alternate field periods and are read therefrom, also during alternate field periods but in inverse order. The read circuits of the stores 40 and 41 serve to retime the address signals into a sequence related to the order in which the addresses are required in an area calculating circuit 42, to facilitate the area calculations.

Figure 6:
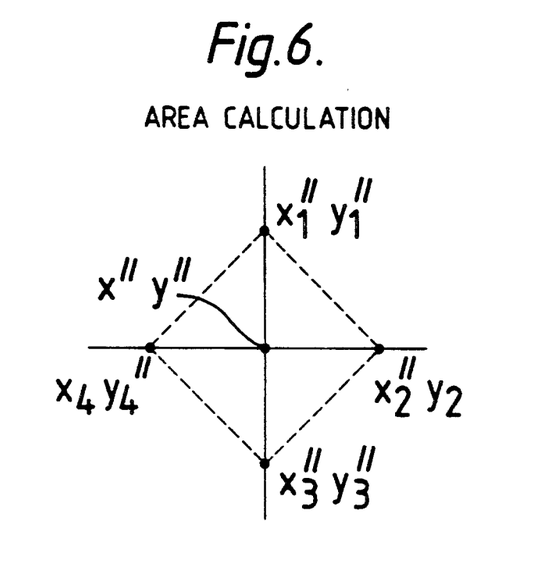
FIG. 6 shows a representative arrangement of pixel addresses which will be used in describing the operation of the system.

The retimed address signals are read to the said calculating circuit 42 which is arranged to calculate for each address the area of the meshes in the address grid at that address. In FIG. 6 a representative address for a given input pixel is x", y" and the address for pixels above, to the right, below and to the left on the coarse address grid are $x_1''$, $y_1''$, $x_2''$, $y_2''$, $x_3''$, $y_3''$, and $x_4''$, $y_4''$ respectively. These four addresses derived from the store 40 and 41 are employed in the circuit 42 to calculate the mesh area at the address x, y using the following algorithm (omitting the primes for convenience)

Area $(x_2+x_1)(y_2-y_1)+(x_3+x_2)(y_3-y_2)+(x_4+x_3)$
$(y_4-y_3)+(x_1+x_4)(y_1-y_4)$ The calculation is repeated for each "coarse" address, the figures from the stores 40 and 41 being read to the calculator 42 in the correct order to produce the required area calculations. It is to be noted that the area is a signed quantity.

Figure 7:
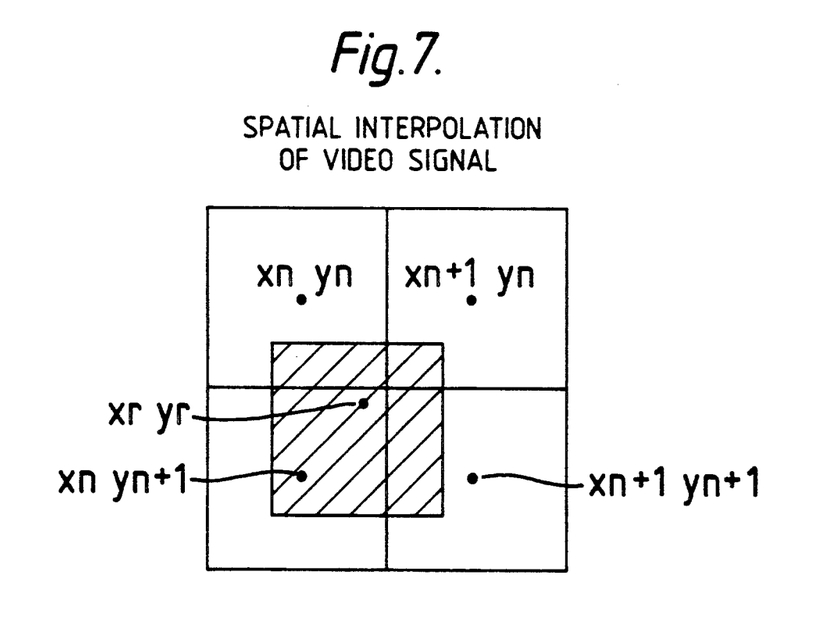
FIG. 7 is another diagram explanatory of the operation of the FIG. 1 arrangement.

The x and y components of the address signals from the stores 40 and 41 are fed to respective x and y interpolators 44 and 45 to produce for each pixel in the input signal raster respective x and y components of the address which the respective video signal should occupy in the output signal raster. The address is for pixels in odd and even numbered lines are produced during alternate field periods. The two interpolators are each similar to the interpolator described with reference to FIG. 8 of our co-pending Patent Application No. 8306789. Assume that an interpolated address for one pixel is $x_r$, $y_r$, as denoted in FIG. 7. As already indicated, this address will not in general coincide with the address of a pixel in the output raster but will lie within the rectangle defined by four pixel addresses, denoted in the representative case of FIG. 7 as $x_n$, $y_n$; $x_{n+1}$, $y_n$; $x_n$, $y_{n+1}$ and $x_{n+1}$, $y_{n+1}$. The interpolated address $x_r$, $y_r$ for each pixel is applied to a calculator 46 (FIG. 1 [part 2]) which may comprise a look up table, which produces, for each interpolated address, signals representing four neighbouring addresses as defined above and applies them as address signals to four frame stores 47 to 50. The calculator 46 also produces four fractional address signals which are applied to multiplying circuits 51 to 54 respectively. These fractional addresses are related to the area of overlap of a pixel at address $x_r$, $y_r$ on the pixels at the neighbouring address as shown in FIG. 7. These fractional address may be derived with the aid of a variety of interpolation functions, as will be known to persons skilled in the art. The area calculator 42, as aforesaid produces signals representing the mesh area at the coarse addresses as defined by the address signals from the stores 40 and 41. These signals are applied to an area interpolator 55 (FIG. 1 [part 1]) which is arranged to produce for each pixel in the input signal raster an interpolated signal called a density compensation co-efficient K. This signal is applied, for each pixel, by way of a connection 43 to a multiplying circuit 56. The area interpolator 55 also produces from the signals from the calculator 42, a signal which represents the sign of the mesh area for each pixel and this signal is applied via connection 43a to two input gates 57 and 58 to select for application to the multiplier 56 one or other of two sources 59 and 60 of input video signals, for a reason to be described subsequently. Assume, for the present, that say gate 57 is open and input video signals are received from the source 59 and applied to the multiplier 56. The video signal for each pixel multiplied by the co-efficient K, is applied in parallel to the four multiplying circuits 51 to 54, where it is multiplied by the fractional addresses. The resultant fractions of the video signal are then applied in the stores to the respective addresses $x_n$, $y_n$; $x_{n+1}$, $y_n$; $x_n$, $y_{n+1}$; and $x_{n+1}$, $y_{n+1}$, as indicated in FIG. 7, to produce the required spatial interpolation of the video signal. Write command signals for each pixel are applied to the four stores in parallel at the appropriate times by the computer 11.

As the writing of the input video signals in the store 47 to 50 continues through a frame period all the addresses in each of the stores will receive a fractional part (which may be 1 or 0 in some cases) of successive video signals. The same address in the four frame stores 47 to 50 will receive the interpolated fractions from four input pixels required to build up the output video signals at the respective address. The output signals are derived by applying sequential address signals and corresponding read command signals from the computer 11, by way of connection 62, to read the four fractional signals from successive identical addresses in the four frame stores. The four fractions are added in the adding circuit 63 to form the output video signal. It will be understood that reading occurs from one field of pixels in each frame store at the same time as writing occurs in the other field of pixels, the functions being alternated at field rate. The sequence of video signals read from the adding circuit 63 therefore represent the same image as the input video signals, but with a shape alteration determined by the address maps read from the store 1, and with such movement as may be introduced by the processors 7 and 10. The re-addressing of the video signals may cause the density of video signals applied to pixels in the output signal raster to vary as a function of the shape alterations or movements of the image. The multiplier 56, however, amplifies or attenuates the video signals in inverse proportion to the signal density to avoid undesired change in brightness over the image.

If the signal from the computer 11, representing the sign of the area derived by the calculator 42, changes sign, this indicates that the image changes from outside to the inside of a surface. For example, on rotating a hollow cylinder using the processors 9 and 10, different parts of the outside and inside surfaces of the cylinder may become visible as the rotation progresses. To deal with a situation such as this the sources 59 and 60 are arranged to provide video signals representing the outside surface and inside surface respectively, and the area-sign signals select the video signals for different pixels of the output raster, depending on the sign signal.

It will be understood that the invention may be realised in practice in many other ways than the example herein described with reference to the drawings.

We claim:

1. A video signal processing system comprising:
   frame store means for storing picture point signals at respective addressable storage locations;
   input means for providing sequences of picture point signals defining successive pictures;
   shape store means for providing address signals representing predetermined addresses in said frame store means for respective picture point signals in a sequence of said picture point signals defining one of said pictures, said predetermined addresses defining a desired transformation in the shape of the picture;
   circuit means for manipulating said address signals provided by the shape store means to produce manipulated address signals defining a change in the transformation of the shape defined by said address signals;
   means for writing the respective picture point signals provided by said input means in locations of said frame store means determined by said manipulated address signals produced by said circuit means to thereby rearrange said picture point signals in a rearranged sequence as compared with the sequence as provided by said input means; and
   reading means for reading said picture point signals from said frame store means in the rearranged sequence, said rearranged sequence producing a change in picture shape.

2. A video signal processing system as in claim 1, wherein said shape store means stores three-dimensional address signals defining a shape in three spatial dimensions, and wherein said circuit means includes means for manipulating said address signals in three spatial dimensions.

3. A video signal processing system as in claim 2, further comprising converting means for converting said three-dimensional address signals into two-dimensional address signals defined in two spatial dimensions, said converting means including means for correcting for perspective when said converting means converts to two-dimensional address signals.

4. A video signal processing system as in claim 2, wherein:
   said predetermined addresses provided by said shape store means represent addresses for picture points which are at positions in a given sequence that are separated from each other by more than one picture point; and
   said shape store means provides address signals representing predetermined addresses for sequences of picture points representing different pictures in the incoming sequence, said different pictures being separated from each other by more than one picture.

5. A video signal processing system as in claim 1, further including operator controllable means for controlling said circuit means to manipulate said address signals to produce manipulated address signals that have been subjected to a change which is at least one of a change in position and a change of orientation of said shape.

6. A video signal processing system as in claim 4, further comprising temporal interpolating means for interpolating between said address signals provided from the shape store means for different pictures.

7. A video signal processing system as in claim 4, further comprising spatial interpolating means for interpolating between said address signals provided from said shape store means representing addresses for picture points separated by more than one picture point.

8. A video signal processing system as in claim 8, wherein said temporal interpolating means comprises means operating on the stored address signals prior to the operation of said circuit means.

9. A video signal processing system as in claim 4, further comprising area calculating means for calculating an area formed by a plurality of separated picture points, said calculating means including means for attributing a positive or a negative sign to the area.

10. A video signal processing system as in claim 9, wherein said input means comprises input means for receiving two sequences of picture point signals, and including selector means for selecting one of said two sequences of picture point signals, said selector means being dependent on the sign of said area calculated by said area calculator.

11. A video signal processing system as in claim 7, in which said spatial interpolating means operates on said manipulated address signals which define a change of the shape defined by said address signals.

12. A system for producing output pictures which are manipulated versions of input pictures, said input and output pictures being represented by pixels, comprising:
    a source of input pixel values for respective pixel positions in a succession of input pictures;
    an output store having addressable locations for storing respective output pixel values for respective pixel positions of a succession of output pictures;
    a source of coarse address maps each of which defines a respective transformation of a respective input picture needed to transform the input picture into a respective output picture, each of said coarse maps comprising addresses which define positions in an output picture for respective input pixel values of a respective input picture, wherein: (i) each coarse address map comprises addresses defining positions in the respective output picture only for input pixel values for pixels of the input picture separated from each other spatially by at least one pixel position, and (ii) the source provides only coarse address maps for input pictures which are separated temporally by at least one input picture in said succession of input pictures;
    a processor which: (i) selectively manipulates spatially said coarse address maps to provide manipulated coarse address maps each of which defines a respective manipulated transformation of a respective input picture, (ii) performs temporal and spatial interpolation of coarse address maps to provide final addresses which define storage locations in the output store for respective fractions of the input pixel values, and (iii) provides fraction signals specifying said fractions; and
    means for storing the pixel values from said source of input pixel values in the output store in accordance with said final addresses and fraction signals, to thereby produce and store in the output store a succession of output pictures which are manipulated versions of said input pictures.

13. A system as in claim 12, in which the coarse map addresses are three dimensional and include depth components which define the distance of pixels from an image plane, and in which the processor converts said three-dimensional addresses to two-dimensional addresses specifying locations in said image plane.

14. A system as in claim 13, in which said two-dimensional addresses specifying locations in said image plane specify locations which are corrected for perspective on the basis of said depth components.

15. A system as in claim 14, in which said processor first performs said temporal interpolation to provide interpolated coarse address maps for input pictures which are in addition to those for which maps are provided by the source of coarse address maps, then selectively manipulates the interpolated maps and those provided by the source of maps, then converts the interpolated maps and those provided by the source of maps to addresses of locations in said image plane, and only then performs spatial interpolation based on said addresses of locations in the image plane to provide said final addresses.

16. A system as in claim 15, in which the processor includes means for deriving density factors K related to a spatial compression or expansion as between an input picture and a respective output picture at respective pixel positions, and the means for storing comprise means for storing the input pixels in the output store in accordance with said density factors as well.

17. A system as in claim 16, in which said input pictures have a front side and a back side, said source of input pixel value comprises first and second sources which provide pixel values defining the front and the back sides, respectively, of said input pictures, said processor comprises means for determining area signs for respective addresses of locations in the image plane which specify whether said locations correspond to front or back sides of the respective input picture, and said means for storing includes a selector switch which is responsive to said area signs to store in the output store input pixel values from a selected one of said first and second sources.

18. A system as in claim 17, in which the processor includes operator controller means for selecting the nature of the manipulation of the coarse maps desired for providing said manipulated coarse maps.

19. A system as in claim 12, in which said processor first performs said temporal interpolation to provide interpolated coarse address maps for input pictures which are in addition to those for which maps are provided by the source of coarse address maps, then selectively manipulates the interpolated maps and those provided by the source of maps, and only then performs said spatial interpolation.

20. A system as in claim 12, in which the processor includes means for deriving density factors K related to spatial compression or expansion as between an input picture and the respective output picture at respective pixel positions, and the means for storing comprise means for storing the input pixels in the output store in accordance with said density factors as well.

21. A system as in claim 12, in which said input pictures have a front side and a back side, said source of input pixel values comprises first and second sources which provide pixel values defining the front and the back sides, respectively, of said input pictures, said processor comprises means for determining area signs for respective locations in the output pictures which specify whether said locations correspond to front or back sides of the respective input picture, and said means for storing includes a selector switch which is responsive to said area signs to store in the output store input pixel values from a selected one of said first and second sources.

22. A method as in claim 12, in which the processor includes operator controlled means for selecting the nature of the manipulation of the coarse maps desired for said manipulated coarse maps.

23. A system for producing output pictures which are manipulated versions of input pictures, said input and output pictures being represented by pixels, comprising:
a source of input pixel values defining the pixels of at least one input picture;
an output store having addressable locations for storing respective output pixel values defining at least one output picture;
a source of at least one address map which defines a respective spatial transformation of a respective input picture needed to transform the input picture into a respective output picture and which comprises addresses defining positions in an output picture for respective input pixel values of an input picture;
a processor which selectively manipulates said at least one address map to provide; (i) a respective manipulated address map defining a respective manipulated transformation of a respective input picture, (ii) final addresses which define storage locations in the output store for respective fractions of the input pixel values, and (iii) fraction signals specifying said fractions; and
means for storing the pixel values from said source of input pixel values in the output store in accordance with said final addresses and fraction signals to thereby produce and store in the output store output pictures which are spatially manipulated versions of input pictures.

24. A system as in claim 23, in which the map addresses are three dimensional and include depth components which define the distance of pixels from a selected image plane, and in which the processor converts said three-dimensional addresses which include depth components to two-dimensional addresses specifying locations in said image plane.

25. A system as in claim 24, in which said two-dimensional addresses specifying locations in said image plane specify locations which are corrected for perspective on the basis of said depth components.

26. A system as in claim 25, in which the processor includes means for deriving density factors K related to spatial compression or expansion as between an input picture and the respective output picture at respective pixel positions, and the means for storing comprise means for storing the input pixels in the output store in accordance with said density factors as well.

27. A system as in claim 26, in which said at least one input picture has a front side and a back side, said source of input pixel values comprises first and second sources which provide pixel values defining said front side and said back side, respectively, said processor comprises means for determining area signs for respective addresses of locations in the image plane which specify whether said locations correspond to front or back sides of the respective input picture, and said means for storing includes a selector switch responsive to said area signs to store in the output store input pixel values from a selected one of said first and second sources.

28. A method as in claim 27, in which the processor includes operator controlled means for selecting the nature of the manipulation of the at least one address map which is needed to provide said at least one manipulated address map.

29. A system as in claim 23, in which said source of input pixel values provides values defining the pixels of a succession of input pictures, said source of at least one address map provides address maps for input pictures which are spaced from each other by other input pictures, and in which the process includes means for interpolating between the addresses within an address map and between the addresses of different address maps to provide final addresses defining positions in the respective output pictures for input pixel values for which said source does not provide addresses.

30. A system as in claim 29, in which the source of input picture values provides the pixel values within an input picture in succession and successively for different input pictures, and said means for interpolating first carries out temporal interpolation between the address maps for pixel values of different pictures and then carries out spatial interpolation between the addresses for pixel values within a picture.

* * * * *